United States Patent
Kadirvel et al.

(10) Patent No.: US 10,355,497 B2
(45) Date of Patent: Jul. 16, 2019

(54) PROTECTION OF PARALLEL CONNECTED CELLS IN BATTERY PACKS

(71) Applicant: Apple Inc., Cupertino, CA (US)

(72) Inventors: Karthik Kadirvel, San Jose, CA (US); Soundararajan Manthiri, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 450 days.

(21) Appl. No.: 15/154,345

(22) Filed: May 13, 2016

(65) Prior Publication Data

US 2016/0336773 A1    Nov. 17, 2016

Related U.S. Application Data

(60) Provisional application No. 62/162,422, filed on May 15, 2015.

(51) Int. Cl.
*H02J 7/00* (2006.01)
*H02J 7/34* (2006.01)

(52) U.S. Cl.
CPC .......... *H02J 7/0026* (2013.01); *H02J 7/0021* (2013.01); *H02J 7/34* (2013.01)

(58) Field of Classification Search
CPC ...... H02J 7/0013; H02J 7/0014; H02J 7/0016; H02J 7/0018; H02J 7/0019

USPC ........................................................ 320/126
See application file for complete search history.

(56) References Cited

U.S. PATENT DOCUMENTS

| | | | |
|---|---|---|---|
| 6,051,955 A | 4/2000 | Saeki | |
| 8,405,357 B2 | 3/2013 | Saeki | |
| 8,803,479 B2 | 8/2014 | Kim | |
| 2013/0063090 A1* | 3/2013 | Takeshita | H02J 7/0031 320/126 |

* cited by examiner

*Primary Examiner* — David V Henze-Gongola
(74) *Attorney, Agent, or Firm* — Blank Rome LLP (57) ABSTRACT

In general, techniques are disclosed for providing short circuit protection to a battery pack having a number of battery cells, at least some of which are connected in parallel. Short circuit protection is provided by using pairs of electronic switches (e.g., integrated circuits consisting of a pair of transistors designed as battery charge/discharge switches) serially connected between one terminal of a battery cell and a battery pack's common node—a position which is upstream of conventional battery pack fault controllers. The state of all such switches may be controlled by a control unit that is also upstream of a conventional fault controller. The combination of switch pairs and control unit can provide a battery pack with over current (short circuit) protection without the use of thermal cutoff devises. The described devices and systems can also provide over voltage, under voltage and over temperature protection.

16 Claims, 8 Drawing Sheets

PROTECTION OF PARALLEL CONNECTED CELLS IN BATTERY PACKS

BACKGROUND

This disclosure relates generally to the protection of electrical and electronic circuits from short circuit conditions. More particularly, but not by way of limitation, this disclosure relates to a technique for protecting parallel coupled battery cells from short circuit and over-temperature conditions.

A thermal cutoff (TCO) is a device that interrupts electric current within a circuit when the TCO is heated to a predetermined threshold. TCOs may be composed of material that melts, or bimetallic strips that separate when heated to a predetermined threshold and function on the order of seconds. TCOs may be characterized as a two-terminal circuit element. During normal operation a TCO allows current flow between its two terminals and, when the current exceeds the TCO's threshold, it passes no current. When conducting, a typical TCO can present 10 milli-ohms (mΩ) ±5 mΩ resistance to the current flow.

SUMMARY

In one embodiment the disclosed concepts provide a battery pack that protects parallel-coupled battery cells from short circuit faults. The battery pack includes a unit configured to retain multiple battery cells at least some of which would be coupled in parallel, each battery cell having a first terminal and a second terminal, wherein each battery cell's first terminal is commonly coupled to a first node and a first switch element is serially coupled between a first battery cell's second terminal and a common node; wherein a first drive input to the first switch element is coupled to a first output of a control circuit, and wherein a second drive input to the first switch element is coupled to a second output of the control circuit, and wherein the second terminal of each of the plurality of battery cells, except the first battery cell, is coupled to the common node. In another embodiment, the battery pack may further comprise a second switch element serially coupled between a second battery cell's second terminal and the common node, wherein: a first drive input to the second switch element is coupled to the first output of the control circuit; and a second drive input to the second switch element is coupled to the second output of the control circuit. In yet another embodiment, the battery pack may further comprise a fault control circuit having a first input coupled to the first node and further configured to connect to a first side of an electrical load, a second input coupled to the common node, and an output configured to couple to a second side of the electrical load. In one embodiment, the first and second switch elements each comprise a pair of serially coupled 3-terminal switching elements such as field-effect transistors (FETs) and bipolar junction transistors (BJTs). In another embodiment, the control circuit and the fault control circuit each comprise a battery charge/discharge control circuit. In yet another embodiment, the battery pack may include a thermistor. By way of example, a first terminal of the thermistor may be coupled to the first node and a second terminal of the thermistor coupled to an over temperature input of the control circuit. The disclosed battery pack may be incorporated into any electronic device which uses parallel-coupled battery cells.

DETAILED DESCRIPTION

This disclosure pertains to systems, devices and systems to improve the operation of portable electronic systems. In general, techniques are disclosed for providing short circuit protection to a battery pack having a number of battery cells, at least some of which are connected in parallel. Circuits and systems disclosed herein provide short circuit protection by using pairs of electronic switches (e.g., integrated circuits consisting of a pair of transistors designed as battery charge/discharge switches) serially connected between one terminal of a battery cell and a battery pack's common node—a position which is upstream of conventional battery pack fault controllers. The state of all such switches may be controlled by a controller that is also upstream of a conventional fault controller. The combination of switch pairs and controller can provide a battery pack with over current (short circuit) protection without the use of thermal cutoff (TCO). The described device and system can also provide over voltage, under voltage and over temperature protection.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of electronic protection systems having the benefit of this disclosure.

Figure 1:
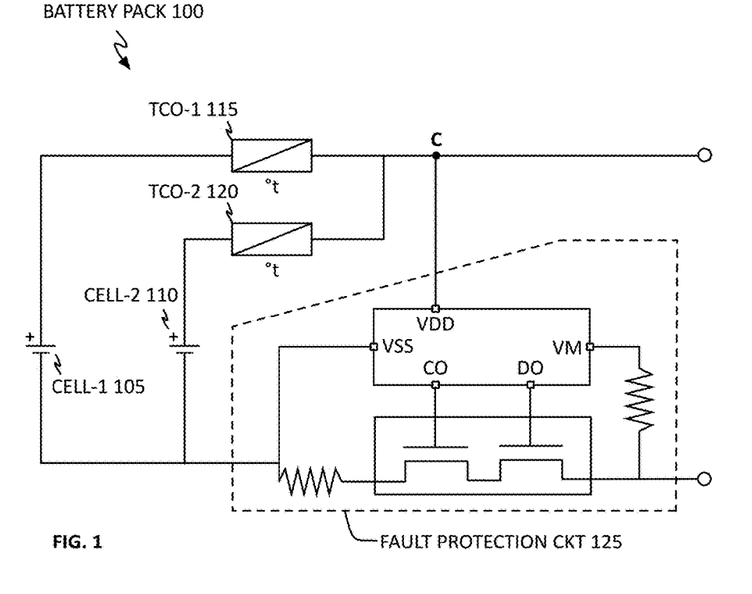
FIG. 1 shows, in block diagram form, a battery pack unit.

Multicell battery packs may use cells in series and parallel to meet system voltage and energy needs. When cells are coupled in parallel, thermal cutoffs (TCOs) have been used to prevent a fault in one cell from affecting another cell. Referring to FIG. 1, battery pack 100 protects cells 105 and 110 by using TCOs 115 and 120 in series between the cells' common node (C) and fault protection circuit 125 (whose function is to protect a downstream circuit such as, for example, a computer system or other battery powered device). Should cell-1 105 (or cell-2 110) develop an internal short, cell-2 110 (or cell-1 105) would begin to immediately dump current into cell-1 105 (or cell-2 110) through TCO-2 120 (or TCO-1 115) thereby heating TCO-2 120 (or TCO-1 320) until its temperature threshold is met (denoted as "° t") at which time TCO-2 120 (or TCO-1 115) opens to halt further current flow. While TCOs may be manufactured to operate at a specific temperature with accuracy, they may only do so at a single temperature and, once manufactured, their threshold or trip-point may not be altered. Further, commercial use of TCOs require that conductive leads be welded/soldered to each terminal so that the subassembly so formed may be properly affixed to a circuit board or other substrate. Not only is this an expensive operation, the subassembly is relatively fragile making it a mechanical challenge to physically attach it to a circuit. Further, TCOs are large (compared to today's integrated circuits) and provide no over/under voltage protection.

Figure 2:
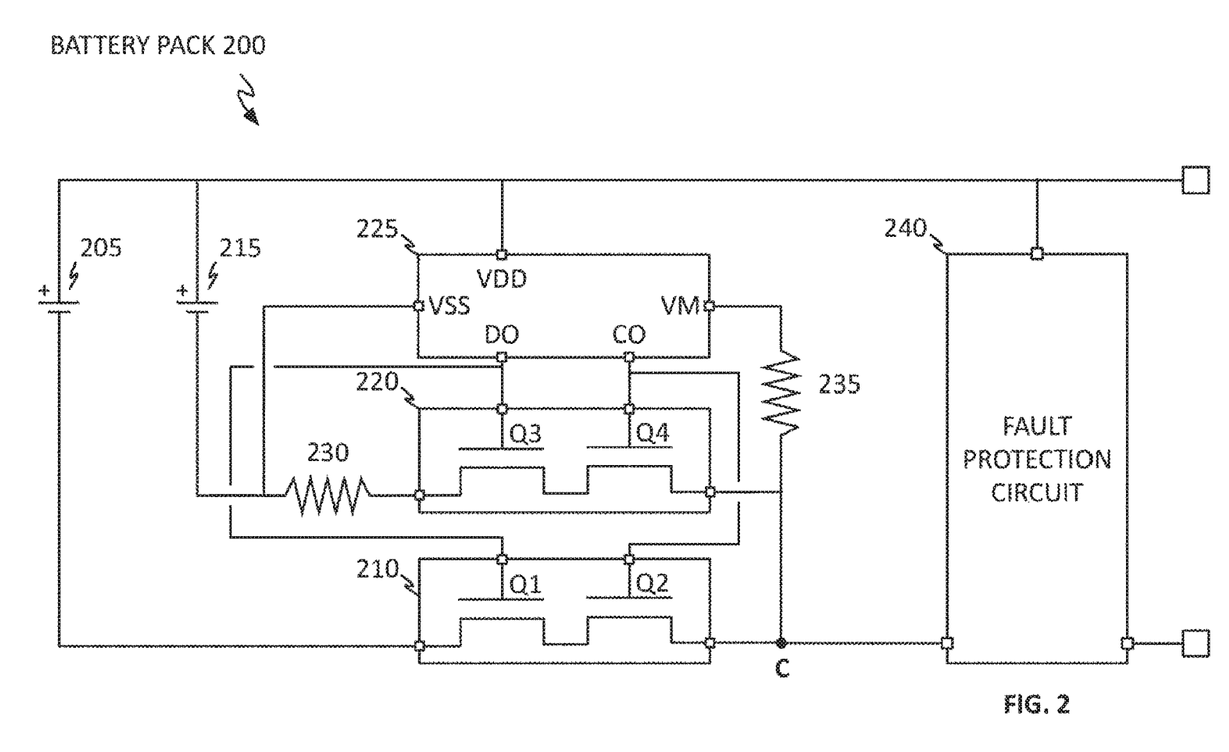
FIG. 2 shows, in block diagram form, a protection circuit in accordance with one embodiment.

Referring to FIG. 2, battery pack 200 in accordance with one embodiment includes active switching elements (e.g., MOSFET and BJT transistors) in series with each battery cell leg before common node C. More specifically, battery pack 200 may include: cell-1 205 and its series-coupled switching element 210 (e.g., transistors Q1 and Q2); cell-2 215 and its series-coupled switching element 220 (e.g., transistors Q3 and Q4); fault protection IC 225; sense resistor 230 and bias resistor 235; and conventional fault protection circuit 240 (may be the same type of fault protection circuit as shown in FIG. 1, element 125). As shown, switching element 210 and switching element 220 have common drive or control connections (e.g., gate signals in illustrative MOSFET transistor pair 210 and 220). That is, the drive (e.g., gate) input for transistor Q1 may be coupled to the drive (e.g., gate) input for transistor Q3 which may be coupled to a discharge output (DO) pin of fault protection IC 225. Similarly, the drive (e.g., gate) input of transistor Q2 may be coupled to the drive (e.g., gate) input of transistor Q4 which may be coupled to a charge output (CO) pin of fault protection IC 225. Fault protection IC 225 may use the same type of IC as that used for fault protection circuit 240 which, in turn, may use the same type of IC as was used for the fault protection circuit 125—one of ordinary skill in the art will recognize that any of a number of battery charge/discharge protection circuits may be used. Sense resistor 230 may be on the order of 5 mΩ and are used to produce a small voltage drop that may be measured by protection IC 225 and used as a proxy for current detection. It should be further understood that fault protection circuit 240 is optional and does not need to be present to obtain the benefits of the disclosed circuits, devices and systems.

Figure 3A:
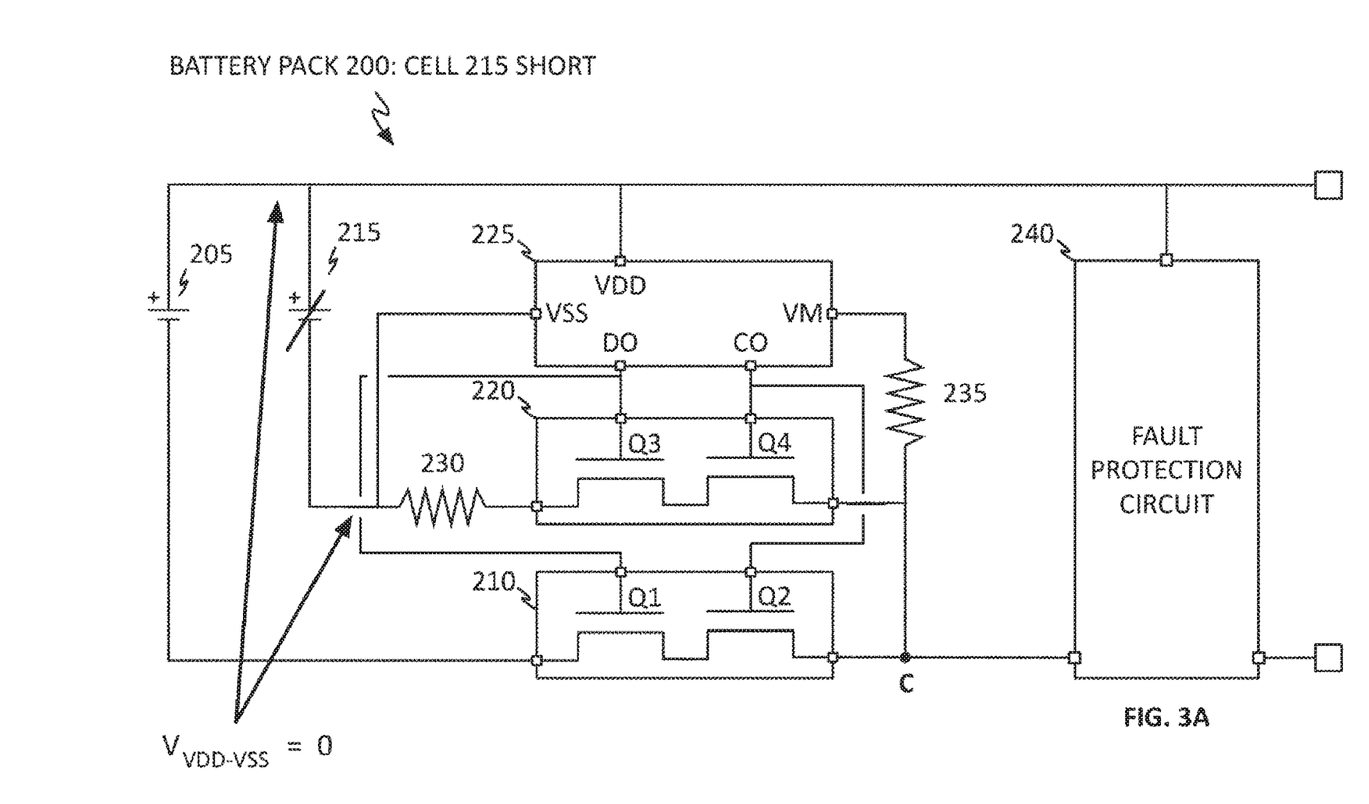
FIGS. 3A and 3B show, in block diagram form, cell short-circuit analysis in accordance with one embodiment.
Figure 3B:
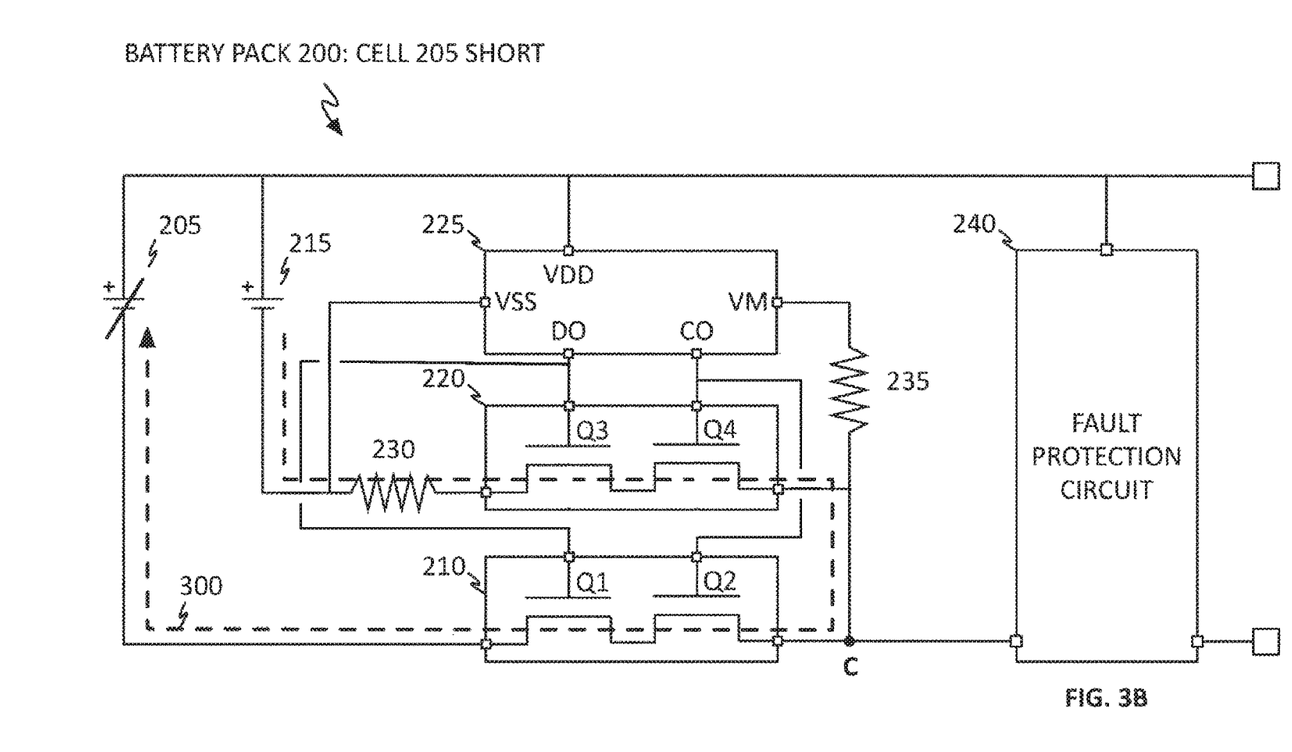

Referring to FIG. 3A, should cell 215 short circuit, the voltage between the $V_{SS}$ and $V_{DD}$ pins of fault protection IC 225 goes to zero causing the switching elements in 210 and 220 to open, stopping current flow from cell 205. Even if fault protection circuit 240 fails, the protection mechanism disclosed herein continues to work making battery pack 200 immune to single fault failures. Referring to FIG. 3B, should cell 205 short circuit, cell 215 begins feeding current as shown by dashed line 300. This, in turn, causes the voltage across sense resistor 230 (i.e., the voltage at the $V_M$ pin of fault protection IC 225) to rise until a threshold or set-point is reached at which time switching element 210 (e.g., transistors Q1 and Q2) turn off to open cell 205's current path.

Figure 4:
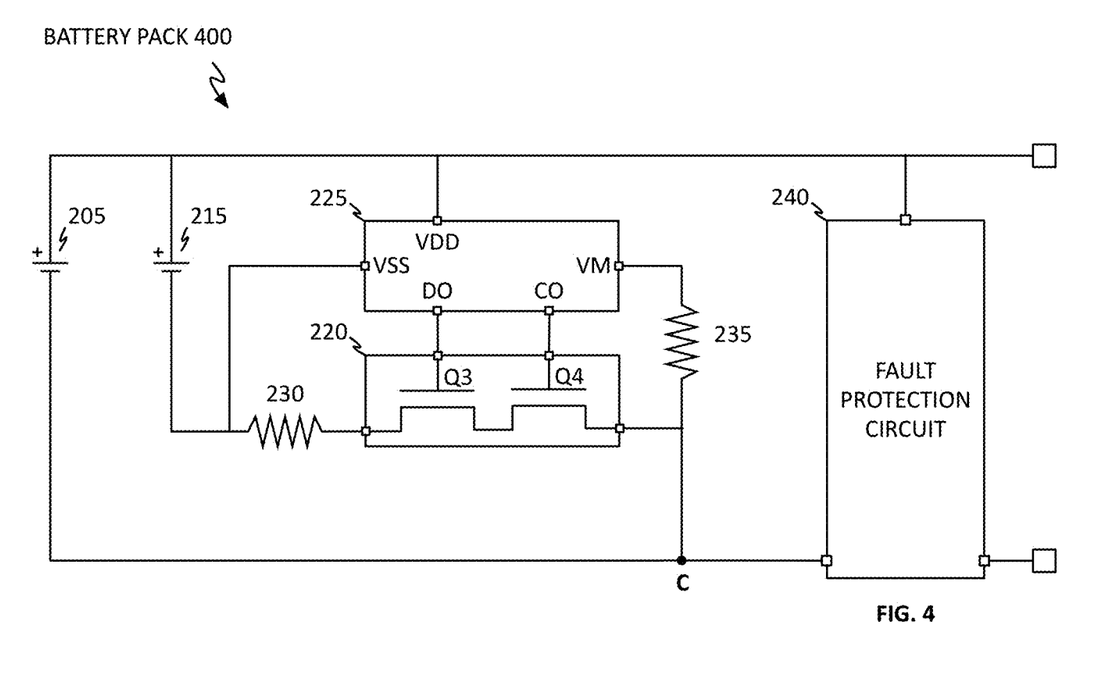
FIG. 4 shows, in block diagram form, a protection circuit in accordance with another embodiment.

Referring to FIG. 4, single leg variant battery pack 400 is similar to battery pack 200 except that switching element 210 may be absent. In this configuration, should cell 215 short circuit, battery pack 400 operates similarly to the circuit shown in FIG. 3A. That is, the voltage between the $V_{SS}$ and $V_{DD}$ pins of fault protection IC 225 goes to zero causing switching element 220 (e.g., transistors Q3 and Q4) to open, preventing cell 205 from pushing current through cell 215's leg. And, while the voltage to fault protection circuit 240 and a downstream load (e.g., a computer system or other battery powered device) may not be directly affected, the available energy to those loads will be decreased by an amount previously supplied by cell 215. On the other hand, should cell 205 short circuit, battery pack 400 operates similarly to the circuit shown in FIG. 3B. That is, cell 215 begins feeding current toward cell 205 through sense resistor 230 and switching element 220. This, in turn, causes the voltage at the $V_M$ pin of fault protection IC 225 to rise until a threshold value is reached at which time switching element 220 turns off to open cell 215's current path causing the voltage to all downstream loads to go to zero.

Figure 5:
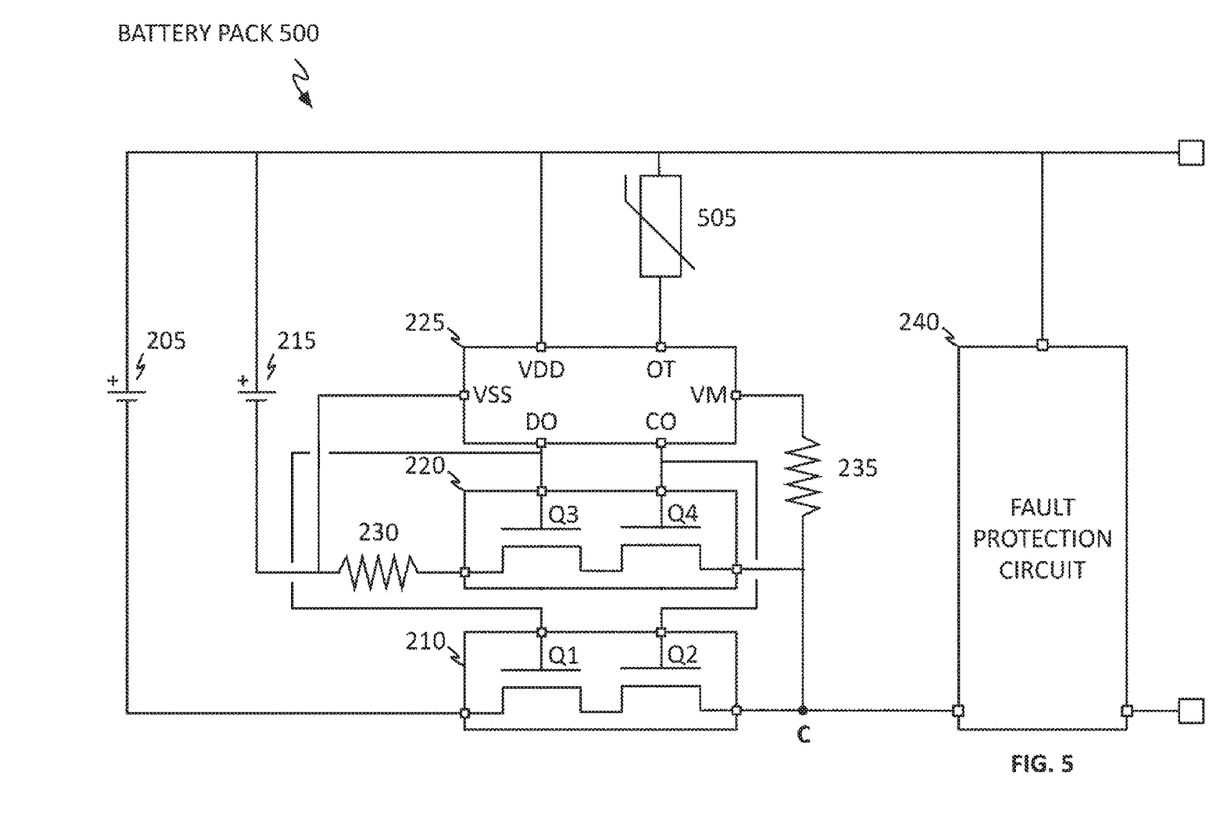
FIG. 5 shows, in block diagram form, a protection circuit in accordance with still another embodiment.
Figure 6:
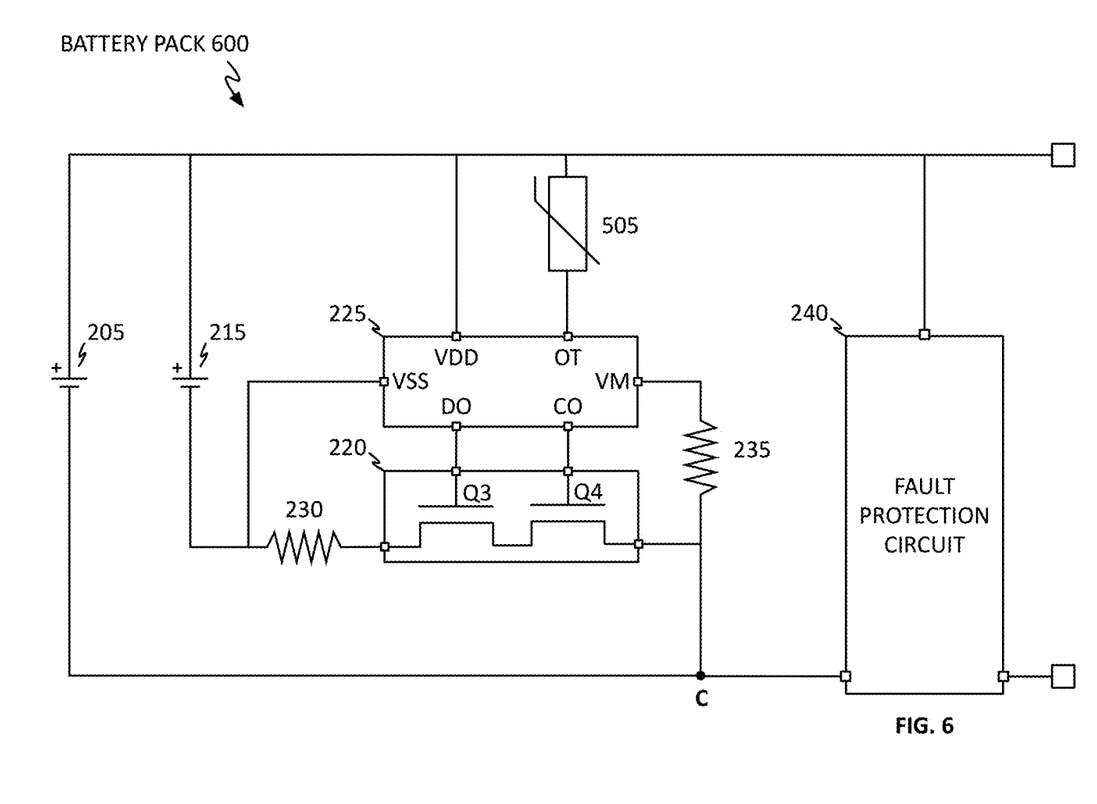
FIG. 6 shows, in block diagram form, a single-leg variant of the embodiment illustrated in FIG. 5.

Referring now to FIG. 5, battery pack 500 is similar to that of battery packs 200 and 400 except that battery pack 500 includes thermistor 505 coupled to fault protection IC 225's over temperature (OT) pin. In this embodiment, voltage at fault protection IC 225's over OT pin may be used as an indication of the circuit's environmental temperature. Should thermistor 505 indicate that the environment's temperature is at (or above) a specified temperature, fault protection IC 225 could cause switching elements 210 and 220 to open. This would "disconnect" cells 205 and 215 turning power off to any downstream load. While this may not be able to halt a temperature increase due to external factors, it stops battery pack 500 from contributing to the effect. Referring to FIG. 6, battery pack 600 is the single-leg variant of the battery pack shown in FIG. 5.

In one embodiment switching elements 210 and 220, when implemented with dual MOSFET ICs, may present approximately 1-3 mΩ when conducting compared to a typical TOC which exhibits approximately 10+ mΩ. This can be a significant difference because the resistance of an element is directly proportional to the power it consumes, and any power used by the battery pack unit itself is not available for use by the ultimate load. Also, and as noted above, the over current set point used in battery pack systems 200, 400, 500 and 600 in accordance with this disclosure is adjustable. Further, battery packs as described herein also provide over voltage protection and immunity to a single fault.

Figure 7A:
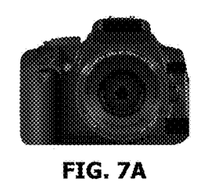
FIGS. 7A-7E show a number of different portable electronic devices in accordance with this disclosure and an illustrative system architecture.
Figure 7B:
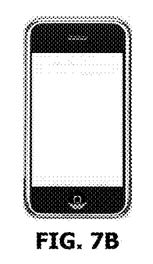
Figure 7C:
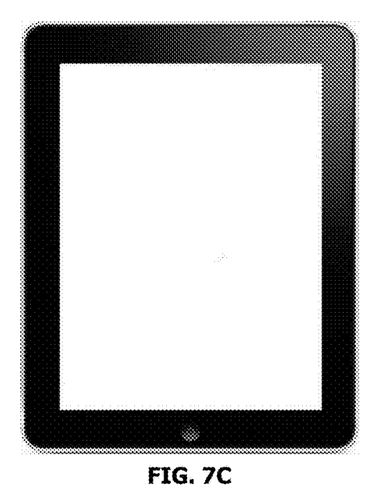
Figure 7D:
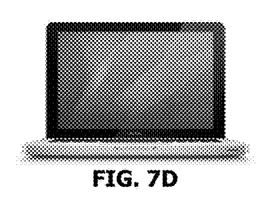
Figure 7E:
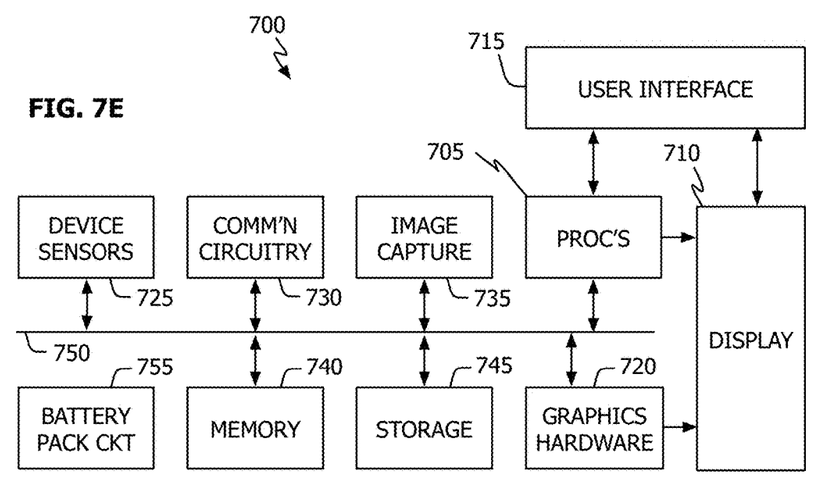

Four illustrative, but not limiting, types of portable electronic devices that may benefit from a battery pack protection circuit or system in accordance with this disclosure are shown in FIG. 7: a generic digital camera (FIG. 7A); a portable or cellular telephone such as a "smart" phone (FIG. 7B); a tablet computer system (FIG. 7C); a notebook (or desktop) computer system (FIG. 7D); and modular computer system (FIG. 7E). A simplified functional block diagram of these devices according to one embodiment may be seen in FIG. 7F. As shown there, electronic device 700 may include processor 705, display 710, user interface 715, graphics hardware 720, device sensors 725 (e.g., proximity sensor/ ambient light sensor, accelerometer and/or gyroscope), communications circuitry 730, image/video capture circuit or unit 735, memory 740, storage 745, communications bus 750, and powering at least some of these elements, battery pack circuitry 755 in accordance with this disclosure.

Processor 705 may execute instructions necessary to carry out or control the operation of many functions performed by device 700 (e.g., such as the generation and/or processing of images or the initiation and maintenance of voice and data transmissions). Processor 705 may, for instance, drive display 710 and receive user input from user interface 715. User interface 715 can take a variety of forms, such as a button, keypad, dial, a click wheel, keyboard, display screen and/or a touch screen. Processor 705 may be a system-on-chip such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable GPUs.

Communication circuitry 730 may provide the ability for device 700 to connect to a network. Such a network may use any desired technology (wired, wireless or a combination thereof) and communication protocol (e.g., TCP, or transmission control protocol and PPP, or point to point). Image capture unit 735 may capture still and/or video images that may be processed to generate images. Output from image capture unit 735 may be processed at least in part by processor 705 and/or graphics hardware 720, and/or a dedicated image processing unit incorporated within circuitry 735. Images so captured may be stored in memory 740 and/or storage 745. Memory 740 may include one or more different types of media used by processor 705, graphics hardware 720, and image capture unit 735 to perform device functions. For example, memory 760 may include memory cache, read-only memory (ROM), and/or random access memory (RAM). Storage 745 may store media (e.g., audio, image and video files), computer program instructions or software, preference information, device profile information, and any other suitable data. Storage 745 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 740 and storage 745 may be used to retain computer program instructions or code organized into one or more modules and written in any desired computer programming language(s). When executed by, for example, processor 705 such computer program code may implement and/or assist in the implementation of one or more of the methods described herein.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, while only two cell systems have been described and shown in FIGS. 2-6, one of ordinary skill in the art will recognize that this disclosure teaches protection systems using more than two parallel-coupled cells and/or systems having series and parallel coupled cells. In one or more embodiments, one or more of the disclosed elements may be omitted and/or connected in a different manner than that described herein. For example, while "battery cells" have been described herein, any particular implementation will likely use battery cell "holders" until the product incorporating the disclosed protection circuits is either shipped or sold. As such, the term "battery cell" should be understood to mean both a battery cell itself and/or a battery cell holder. Further, in the discussion of FIG. 4, FET pair 210 was assumed to have been removed. It should be realized however that the operation of protection circuit 400 is electrically identical had FET pair 220 been removed instead. Accordingly, the specific selection of elements shown if FIGS. 2-6 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A battery pack comprising:
   a first cell having first and second terminals;
   a second cell having first and second terminals, the first terminal of the second cell being coupled to the first terminal of the first cell;
   a first switching element coupled in series with the first cell and a sensing resistor, the first switching element having at least one control terminal; and
   a fault protection integrated circuit having at least one output pin coupled to the at least one control terminal of the first switching element and at least three input pins including a first input pin coupled to the first terminals of the first and second cells, a second input pin coupled to the sensing resistor, and a third input pin coupled to a common terminal of the battery pack;
   wherein the fault protection integrated circuit is configured to perform at least one of:
      opening the first switching element responsive to a voltage at the second input pin being equal to a voltage at the first input pin indicating a fault of the first cell; and
      opening the first switching element responsive to a voltage at the second input pin exceeding a predetermined threshold indicating a fault of the second cell.

2. The battery pack of claim 1, further comprising a second switching element coupled in series with the second cell and having at least one control terminal, wherein:
   the at least one output pin of the fault protection integrated circuit is further coupled to the at least one control terminal of the second switching element; and
   wherein the fault protection integrated circuit is further configured to perform at least one of:
      opening the second switching element responsive to a voltage at the second input pin being equal to a voltage at the first input pin indicating a fault of the first cell; and
      opening the first switching element responsive to a voltage at the second input pin exceeding a predetermined threshold indicating a fault of the second cell.

3. The battery pack of claim 2, wherein each of the first and the second switching elements comprise respective first and second field effect transistors (FETs).

4. The battery pack of claim 2, wherein:
  the at least one output pin of the fault protection integrated circuit comprises a first output pin that is configured to provide a first output signal that corresponds to a gate drive signal to at least one of the first FETs of the first and the second switching elements; and
  the at least one output pin of the fault protection integrated circuit comprises a second output pin that is configured to provide a second output signal that corresponds to a gate drive signal to at least one of the second FETs of the first and the second switching elements.

5. The battery pack of claim 2, further comprising a second fault protection integrated circuit, wherein at least one of the first and circuit fault protection circuits comprise a battery charge/discharge control circuit.

6. The battery pack of claim 2, further comprising a thermistor coupled to the fault protection integrated circuit, wherein the fault protection integrated circuit is further configured to open the first switching element responsive to a temperature indicated by the thermistor.

7. The battery pack of claim 1, further comprising a second fault protection integrated circuit, wherein at least one of the first and circuit fault protection circuits comprise a battery charge/discharge control circuit.

8. The battery pack of claim 1, further comprising a thermistor coupled to the fault protection integrated circuit, wherein the fault protection integrated circuit is further configured to open the first switching element responsive to a temperature indicated by the thermistor.

9. A portable electronic device, comprising:
  functional circuitry configured to provide at least one function consistent with the portable electronic device, the functional circuitry configured to receive power through a first connection and a second connection; and
  a battery pack including:
    a first cell having first and second terminals;
    a second cell having first and second terminals, the first terminal of the second cell being coupled to the first terminal of the first cell;
    a first switching element coupled in series with the first cell and a sensing resistor, the first switching element having at least one control terminal; and
    a fault protection integrated circuit having at least one output pin coupled to the at least one control terminal of the first switching element and at least three input pins including a first input pin coupled to the first terminals of the first and second cells, a second input pin coupled to the sensing resistor, and a third input pin coupled to a common terminal of the battery pack;
  wherein the fault protection integrated circuit is configured to perform at least one of:
    opening the first switching element responsive to a voltage at the second input pin being equal to a voltage at the first input pin indicating a fault of the first cell; and
    opening the first switching element responsive to a voltage at the second input pin exceeding a predetermined threshold indicating a fault of the second cell.

10. The portable electronic device of claim 9, wherein the battery pack further includes a second switching element coupled in series with the second cell and having at least one control terminal, wherein:
  the at least one output pin of the fault protection integrated circuit is further coupled to the at least one control terminal of the second switching element; and
  wherein the fault protection integrated circuit is further configured to perform at least one of:
    opening the second switching element responsive to a voltage at the second input pin being equal to a voltage at the first input pin indicating a fault of the first cell; and
    opening the first switching element responsive to a voltage at the second input pin exceeding a predetermined threshold indicating a fault of the second cell.

11. The portable electronic device of claim 10, wherein each of the first and the second switching elements comprise respective first and second field effect transistors (FETs).

12. The portable electronic device of claim 11, wherein:
  the at least one output pin of the fault protection integrated circuit comprises a first output pin that is configured to provide a first output signal that corresponds to a gate drive signal to at least one of the first FETs of the first and the second switching elements; and
  the at least one output pin of the fault protection integrated circuit comprises a second output pin that is configured to provide a second output signal that corresponds to a gate drive signal to at least one of the second FETs of the first and the second switching elements.

13. The portable electronic device of claim 10, wherein the battery pack further includes a second fault protection integrated circuit, wherein at least one of the first and circuit fault protection circuits comprise a battery charge/discharge control circuit.

14. The portable electronic device of claim 10, wherein the battery pack further includes a thermistor coupled to the fault protection integrated circuit, wherein the fault protection integrated circuit is further configured to open the first switching element responsive to a temperature indicated by the thermistor.

15. The portable electronic device of claim 9, wherein the battery pack further includes a second fault protection integrated circuit, wherein at least one of the first and circuit fault protection circuits comprise a battery charge/discharge control circuit.

16. The portable electronic device of claim 9, wherein the battery pack further includes a thermistor coupled to the fault protection integrated circuit, wherein the fault protection integrated circuit is further configured to open the first switching element responsive to a temperature indicated by the thermistor.

* * * * *